(12) United States Patent
Tarbouriech

(10) Patent No.: US 7,565,541 B1
(45) Date of Patent: Jul. 21, 2009

(54) DIGITAL FINGERPRINT IDENTIFICATION SYSTEM

(75) Inventor: Philippe Tarbouriech, San Francisco, CA (US)

(73) Assignee: Microvision, Inc., Redmond, WA (US)

( * ) Notice: Subject to any disclaimer, the term of this patent is extended or adjusted under 35 U.S.C. 154(b) by 609 days.

(21) Appl. No.: 09/598,793

(22) Filed: Jun. 21, 2000

(51) Int. Cl.
H04L 9/00 (2006.01)
(52) U.S. Cl. ...................... 713/176; 382/124
(58) Field of Classification Search .............. 382/124, 382/125, 115, 118; 356/71; 713/176
See application file for complete search history.

(56) References Cited

U.S. PATENT DOCUMENTS

| | | | |
|---|---|---|---|
| 3,845,394 A | 10/1974 | Hamada | |
| 3,882,462 A * | 5/1975 | McMahon | 382/127 |
| 4,047,154 A * | 9/1977 | Vitols et al. | 382/125 |
| 4,067,061 A | 1/1978 | Juhasz | |
| 4,075,567 A | 2/1978 | Klank et al. | |
| 4,163,203 A | 7/1979 | Morii et al. | |
| 4,344,136 A | 8/1982 | Panik | |
| 4,395,624 A | 7/1983 | Wartski | |
| 4,644,368 A | 2/1987 | Mutz | |
| 4,685,061 A | 8/1987 | Whitaker | |
| 4,804,937 A | 2/1989 | Barbiaux et al. | |
| 4,815,110 A | 3/1989 | Benson et al. | |
| 4,853,856 A | 8/1989 | Hanway | |
| 4,853,859 A | 8/1989 | Morita et al. | |
| 4,856,072 A | 8/1989 | Schneider et al. | |
| 4,858,133 A | 8/1989 | Takeuchi et al. | |
| 4,866,616 A | 9/1989 | Takeuchi et al. | |
| 4,875,167 A | 10/1989 | Price et al. | |
| 4,939,652 A | 7/1990 | Steiner | |
| 5,046,007 A | 9/1991 | McCrery et al. | |
| 5,065,321 A | 11/1991 | Bezos et al. | |
| 5,072,701 A | 12/1991 | Khan et al. | |
| 5,189,630 A | 2/1993 | Barstow et al. | |
| 5,214,792 A | 5/1993 | Alwadish | |
| 5,239,470 A | 8/1993 | Komatsu | |
| 5,303,401 A | 4/1994 | Duckeck et al. | |
| 5,305,214 A | 4/1994 | Komatsu | |
| 5,325,082 A | 6/1994 | Rodriguez | |
| 5,337,236 A | 8/1994 | Fogg et al. | |

(Continued)

FOREIGN PATENT DOCUMENTS

WO    WO 91/11062 A    7/1991

(Continued)

OTHER PUBLICATIONS

PCT International Search Report.

*Primary Examiner*—Carl Colin
(74) *Attorney, Agent, or Firm*—Kevin D. Wills

(57) ABSTRACT

Methods, apparatuses, and systems for identifying a digital fingerprint. One embodiment compensates for the inaccuracies resulting from the unstable nature of the circuits that yield digital fingerprints and, therefore, allows for reliable identification of these digital fingerprints. According to one embodiment, the digital fingerprint (identification) is divided into a plurality of sections and stored in a database. According to this embodiment, fingerprints are identified by comparing the sections of the fingerprint to be identified with corresponding sections of the fingerprints stored in the database. The matching fingerprint, in one embodiment, is the fingerprint associated with a statistically sufficient number of matching fingerprint sections. Other embodiments of the present invention optimize the section lookup methodology based on the stability of the sections of the fingerprint.

16 Claims, 4 Drawing Sheets

U.S. PATENT DOCUMENTS

| | | | | |
|---|---|---|---|---|
| 5,379,219 | A | 1/1995 | Ishibashi | |
| 5,382,970 | A | 1/1995 | Kiefl | |
| 5,440,301 | A | 8/1995 | Evans | |
| 5,444,499 | A | 8/1995 | Saitoh | |
| 5,539,635 | A | 7/1996 | Larson, Jr. | |
| 5,550,738 | A | 8/1996 | Bailey et al. | |
| 5,664,110 | A | 9/1997 | Green | |
| 5,689,822 | A | 11/1997 | Zucker | |
| 5,703,795 | A | 12/1997 | Mankovitz | |
| 5,734,973 | A | 3/1998 | Honda | |
| 5,740,244 | A * | 4/1998 | Indeck et al. | 713/176 |
| 5,740,534 | A | 4/1998 | Ayerst et al. | |
| 5,790,958 | A | 8/1998 | McCoy et al. | |
| 5,794,230 | A | 8/1998 | Horadan et al. | |
| 5,826,164 | A | 10/1998 | Weinblatt | |
| 5,890,175 | A | 3/1999 | Wong et al. | |
| 5,907,627 | A * | 5/1999 | Borza | 382/124 |
| 5,918,213 | A | 6/1999 | Bernard et al. | |
| 5,933,515 | A * | 8/1999 | Pu et al. | 382/124 |
| 5,949,492 | A | 9/1999 | Mankovitz | |
| 5,963,679 | A * | 10/1999 | Setlak | 382/312 |
| 5,995,630 | A * | 11/1999 | Borza | 380/54 |
| 6,021,211 | A * | 2/2000 | Setlak et al. | 382/124 |
| 6,026,193 | A * | 2/2000 | Rhoads | 382/232 |
| 6,028,773 | A * | 2/2000 | Hundt | 361/760 |
| 6,038,434 | A | 3/2000 | Miyake | |
| 6,058,238 | A * | 5/2000 | Ng | 386/46 |
| 6,067,562 | A | 5/2000 | Goldman | |
| 6,122,394 | A * | 9/2000 | Neukermans et al. | 382/124 |
| 6,161,213 | A * | 12/2000 | Lofstrom | 716/4 |
| 6,163,683 | A | 12/2000 | Dunn et al. | |
| 6,192,223 | B1 | 2/2001 | Barnett et al. | |
| 6,226,729 | B1 * | 5/2001 | Stevens et al. | 711/171 |
| 6,259,804 | B1 * | 7/2001 | Setlak et al. | 382/124 |
| 6,282,412 | B1 | 8/2001 | Lyons | |
| 6,289,114 | B1 * | 9/2001 | Mainguet | 382/124 |
| 6,314,577 | B1 | 11/2001 | Pocock | |
| 6,333,989 | B1 * | 12/2001 | Borza | 382/124 |
| 6,381,346 | B1 * | 4/2002 | Eraslan | 382/118 |
| 6,389,271 | B1 | 5/2002 | Kaneko | |
| 6,429,666 | B1 * | 8/2002 | Um | 324/693 |
| 6,466,209 | B1 * | 10/2002 | Bantum | 345/589 |
| 6,751,667 | B1 * | 6/2004 | Helliwell | 709/226 |
| 6,901,604 | B1 | 5/2005 | Kiraly | |

FOREIGN PATENT DOCUMENTS

| | | |
|---|---|---|
| WO | WO-9111062 | 7/1991 |
| WO | WO 97/01137 A | 1/1997 |
| WO | WO-9701137 | 1/1997 |
| WO | WO 98/03923 A | 1/1998 |
| WO | WO 98/21664 A | 5/1998 |
| WO | WO-9821664 | 5/1998 |
| WO | WO 99/18518 A | 4/1999 |
| WO | WO-9918518 | 4/1999 |

* cited by examiner

Fig._1

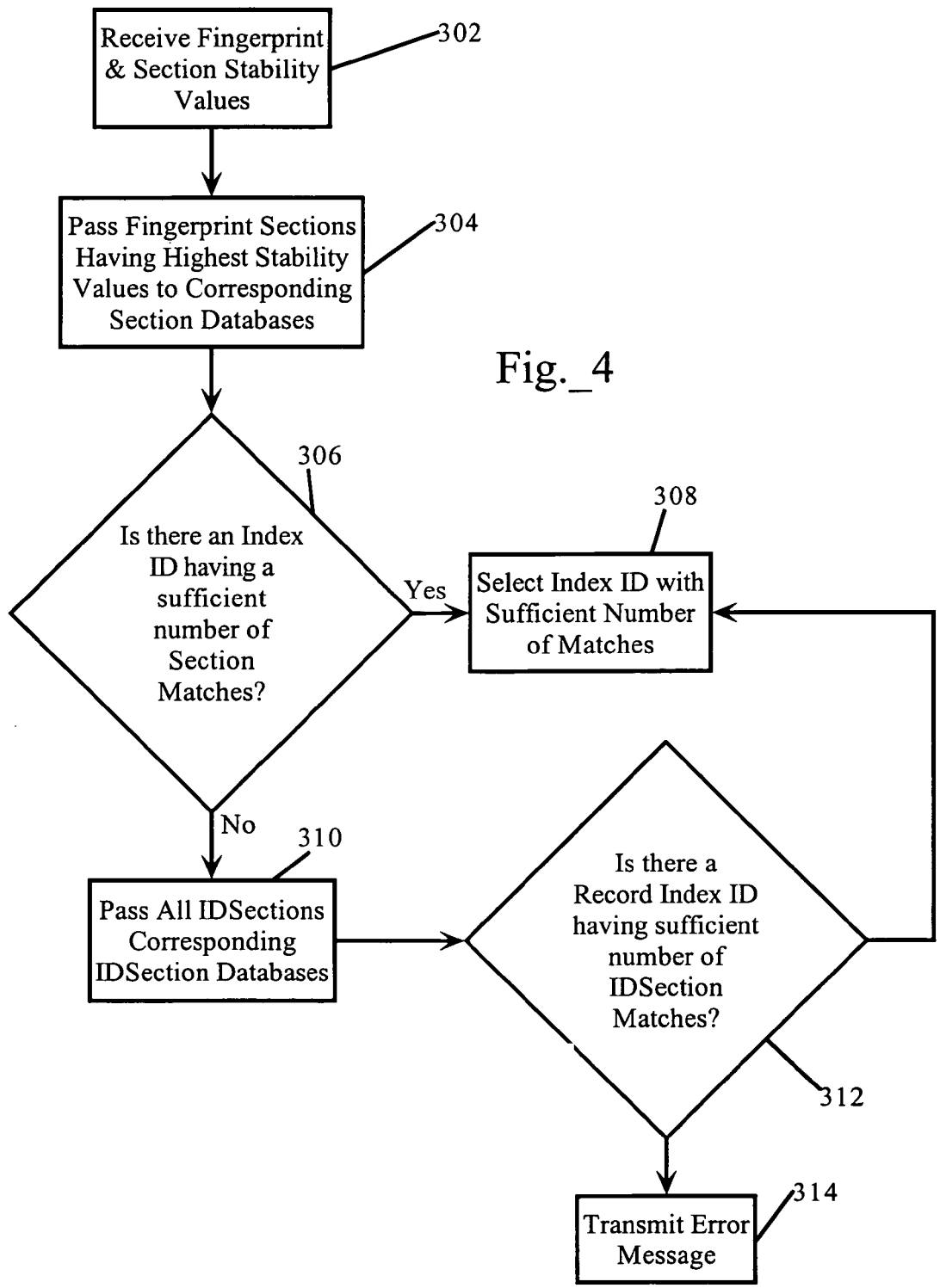
Fig._4

DIGITAL FINGERPRINT IDENTIFICATION SYSTEM

FIELD OF THE INVENTION

The present invention relates to digital fingerprints and, more particularly, to methods, apparatuses and systems for addressing the inaccuracies introduced by the unstable nature of digital fingerprint circuits and allowing reliable identification of the digital fingerprints.

BACKGROUND OF THE INVENTION

Silicon fingerprinting technology offers an inexpensive technique for generating unique digital signatures or identifications. According to one fingerprinting technology, the fabrication of a silicon die including chip features that are not perfectly precise creates a random effect that can be used to generate a random binary number. A circuit is embedded into each chip including a series of small, tightly-packed transistors and a comparator that compares the relative voltages between adjacent transistors. The impurities of dopant levels and variations in size among individual transistors that naturally occur in metal-oxide semiconductors result in varying voltage levels across transistors when they are powered up. According to the technology, a comparison of voltage levels among transistors yields a binary number unique to the chip. Specifically, starting at the first transistor or bit, the comparator compares the voltage of the first transistor to the voltage of the adjacent transistor. If the voltage level of the first transistor is less than that of the second transistor, the comparator yields a "0" for that bit. Conversely, if the voltage level of the first transistor exceeds the voltage level of the adjacent transistor, the comparator yields a value of "1." This process is repeated for each transistor in the series to yield the binary number resulting from the varying voltage levels of each transistor.

The number of bits in the ID depends on how many transistors the circuit includes. During production, each bit sequence acquires a random pattern resulting from differences in dopant levels and size among individual transistors. The result is a group of chips that have essentially inherited a identification as part of the manufacturing process, wherein each chip ends up with a sequence that is unique. If the silicon chip has enough transistors (bits), it can be used as a serial number or other device identification. According to the technology, the unique signature or identification is simply read from the chip when it is powered up. This bit sequence can be probed and stored in a database with pertinent information for later use.

Silicon fingerprinting technology is not perfectly precise, however, in that the same circuit may not yield the same binary number upon successive reads of the chip. As described above, the random value of a particular bit is a function of an imbalance between the physical attributes of two transistors on the chip. Sometimes, the voltage difference between adjacent transistors is so small, the comparator can not reliably indicate which transistor is relatively high or low, causing certain of these bits to "flip" during some reads of the circuit. According to Siidtech, Inc. of Beaverton, Oreg., up to 5% of the bits in a given circuit can flip from one read to another. One solution to address the uncertainty is to use enough bits in the serial number to make it statistically impossible for a flipping of bits to cause misinterpretation of one serial number into another one. For example, a 512-bit sequence results in an enormous hamming distance (number of bit flips that could cause a misread) rendering it quite easy to unambiguously identify the original candidate. The method advocated by Siidtech, Inc. involves computing a distance between the number read from the circuit and all candidates stored in the database. In one form, an initial sequence of bits is used as an index to identify a list of candidates for further matching. However, this process can be problematic as the number of candidates grows large since the processing demands involved in verifying a digital fingerprint can become prohibitive, especially in situations where the digital fingerprint must be quickly identified. In light of the foregoing, a need exists for methods, apparatuses and systems that address the instabilities inherent in existing digital fingerprint technologies.

SUMMARY OF THE INVENTION

The present invention provides methods, apparatuses, and systems for identifying a digital fingerprint. In one embodiment, the present invention compensates for the inaccuracies resulting from the unstable nature of the circuits that yield digital fingerprints and, therefore, allows for reliable identification of these digital fingerprints. According to one embodiment, the digital fingerprint (identification) is divided into a plurality of sections and stored in a database. According to this embodiment, fingerprints are identified by comparing the sections of the fingerprint to be identified with corresponding sections of the fingerprints stored in the database. The matching fingerprint, in one embodiment, is the fingerprint associated with a statistically sufficient number of matching fingerprint sections. Other embodiments of the present invention optimize the section lookup methodology based on the stability of the sections of the fingerprint.

DESCRIPTION OF THE DRAWINGS

FIG. 4 is a flow chart diagram illustrating another method allowing for identification of a digital fingerprint.

DESCRIPTION OF PREFERRED EMBODIMENTS

Figure 1:
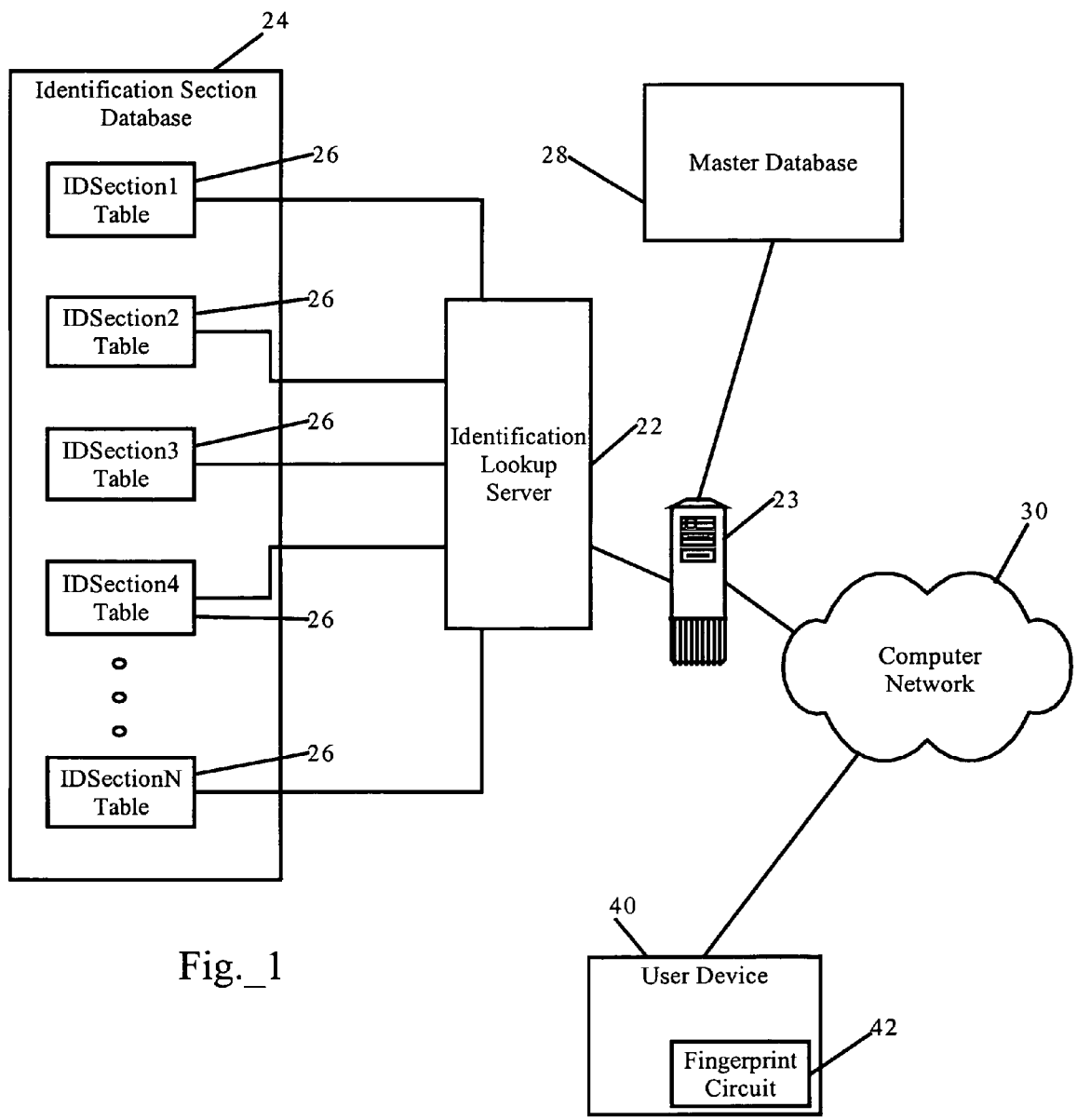
FIG. 1 is a functional block diagram illustrating an embodiment of the present invention.

FIG. 1 illustrates an embodiment of the apparatus according to the present invention. As FIG. 1 shows, in one embodiment, the apparatus comprises identification lookup server 22, fingerprint section database 24. In one embodiment, the apparatus operates in conjunction with application server 23 and master database 28. Application server 23, in one embodiment, receives requests transmitted over computer network 30, executes application functionality as appropriate, and transmits responses in return. In one embodiment, identification lookup server 22 is operably connected to computer network 30 to receive identification information from user device 40 via application server 23. As more fully described below, in the embodiment shown, application server 23 receives a fingerprint or identification from user device 40 and transmits it to identification lookup server 22. Identification lookup server 22 receives identification information from user device 40 and scans fingerprint section database 24 to identify user device 40 (see below).

According to one embodiment, the digital fingerprint (identification) is broken into a plurality of sections and stored in a fingerprint section database 24. In one embodiment, when identification lookup server 22 receives identification or fingerprint data from user device 40, it scans fingerprint section database 24 for stored sections that match corresponding sections of the identification or fingerprint transmitted from user device 40. In one embodiment, fingerprint section database 24 stores fingerprint sections in association with an index identification associated with user device 40. In one embodiment, identification lookup server 22 selects the index identification associated with a statistically sufficient number of matching fingerprint sections (see below). In one embodiment, the number of sections into which the fingerprint is divided and their length are predetermined.

Fingerprint section database 24 can be a flat-file database, a relational database, or any other suitable database. In one embodiment, fingerprint section database 24 comprises a series of records, whose fields include an index identification and the sections of the fingerprint. In one embodiment, such records can also include other fields, such as the user or entity name associated with the fingerprint. In the embodiment shown in FIG. 1, however, such data is stored in master database 28 in association with the index identification. More specifically, as FIG. 1 shows, application server 23 is operably connected to master database 28. In one embodiment, master database 28 includes index identifications and data associated with each index identification. In one embodiment, such data is user account data, such as user name, address, account identification, and any other relevant account or device information. According to this embodiment, when identification lookup server 22 has identified the device (e.g., finding an index identification), application server 23 can use the index identification to access relevant data stored in master database 28. Of course, the distribution of functionality and/or data described in the various embodiments is not required by any constraint. In one embodiment, a single computing device can execute the methods of the present invention and store the required data.

In one embodiment, fingerprint section database 24 comprises a plurality of fingerprint section tables 26. In one form, each fingerprint section table 26 includes the corresponding section of the fingerprint and the associated index identification. In one form, a single database server supports fingerprint section database 24. In another embodiment, each fingerprint section table 26 is supported by an individual database server to expedite identification of the fingerprint associated with user device 40.

As FIG. 1 shows, in one embodiment, user device 40 includes fingerprint circuit 42 which, as discussed above, provides a unique binary number. In one embodiment, user device 40 includes digital fingerprint circuit 42, control circuit 60 and memory 62 (see FIG. 5). In one embodiment, digital fingerprint circuit 42 comprises a series of tightly packed, small transistors (ID Cell Array 54) and a comparator 56 that compares the relative voltages of adjacent transistors. (See Background of the Invention, above and FIG. 5). In another embodiment, fingerprint circuit 42 comprises static RAM, which, at initial power on, yields a random binary number that can be used as a digital fingerprint. User device 40 can be any device that includes integrated circuits, including a personal computer, a cell phone, a personal digital assistant, an MP3 player, or any other suitable device. In one embodiment, user device 40 is a physical parameter sensing unit of the type disclosed in application Ser. No. 09/303,021 filed Apr. 30, 1999 and application Ser. No. 09/559,031 filed Apr. 27, 2000, now U.S. Pat. No. 6,650,877 both entitled "Method and System for Identifying Data Locations Associated with Real World Observations" and incorporated by reference herein. In one form, digital fingerprint circuit 42 can be included on a separate, dedicated chip in user device 40. In a preferred form, fingerprint circuit 42 is integrated during manufacturing into the circuitry of an existing chip in user device 40.

A. Center of Gravity Calculation and Storage of Digital Fingerprint

One embodiment of the present invention provides methods and apparatuses yielding the most probable digital fingerprint output by a particular digital fingerprint circuit. Because the probability that a particular bit may flip upon successive reads of a digital fingerprint is a function of physical parameters, the probability function of its value does not change significantly over time, even though the bit itself may be very likely to flip. In one embodiment, the digital fingerprint is iteratively read a predetermined number of times in order to calculate the most likely value for each bit in the digital fingerprint. In one embodiment, the most likely digital fingerprint is stored and used for identification.

Figure 5:
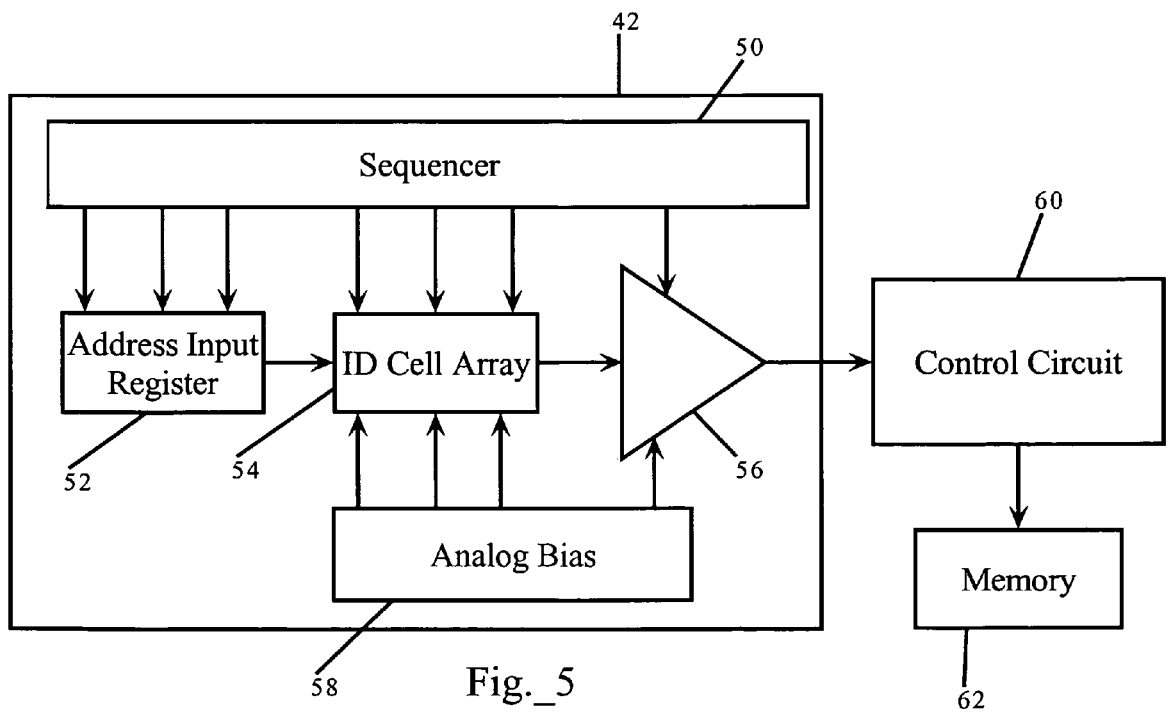
FIG. 5 is a functional block diagram illustrating an embodiment of a digital fingerprint/control circuit according to the present invention.

FIG. 5 illustrates an apparatus according to one embodiment of the present invention for calculating the most probable digital fingerprint from fingerprint circuit 42. In one embodiment, the apparatus comprises fingerprint circuit 42, control circuit 60 and memory 62. In the embodiment shown, fingerprint circuit 42 is a standard digital fingerprint circuit comprising sequencer 50, address input register 52, ID Cell Array 54, comparator 56, and analog bias 58. These components operate, as discussed above, to yield a binary number resulting from the relative voltage differences among the transistors in ID Cell Array 54. Fingerprint circuit 42, however, can comprise static RAM or any other means of yielding a random string of bits. With the use of static RAM, the fingerprint, in one embodiment, is read at power on and does not involve the use of a comparator to compare relative voltages of adjacent transistors. In one embodiment, control circuit 60 is configured to execute the method illustrated in FIG. 2.

Figure 2:
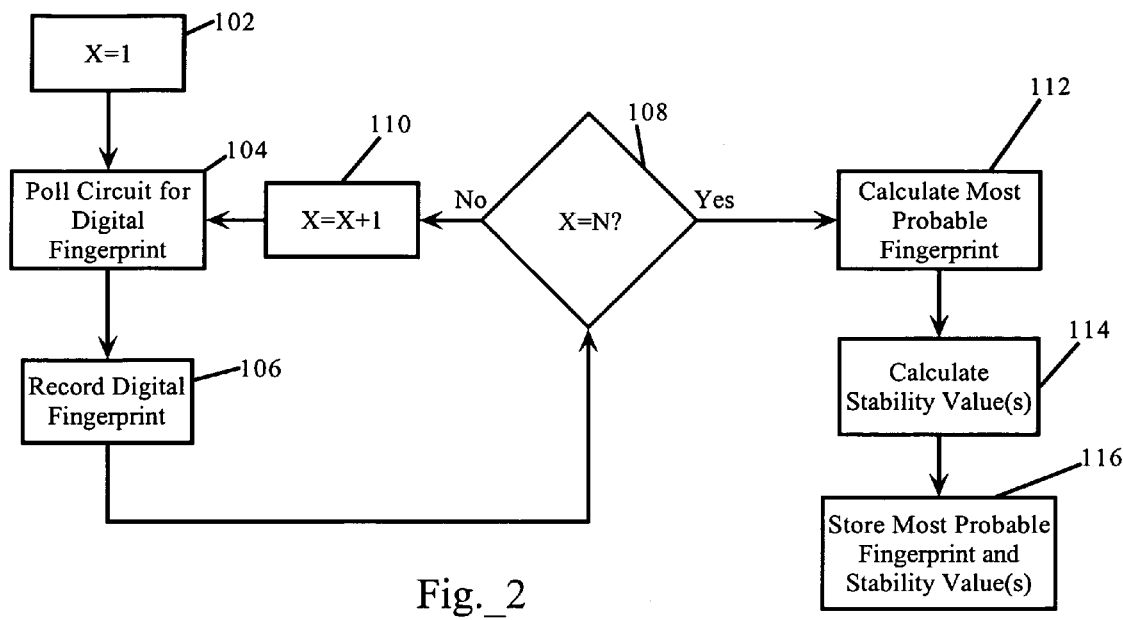
FIG. 2 is a flow chart diagram setting forth a method for calculating a most probable identification number.

As FIG. 2 shows, control circuit 60 polls fingerprint circuit 42 a desired number (N) times and records each resulting fingerprint value (steps 102, 104, 106, 108 and 110). From these recorded values, control circuit 60 calculates the most probable digital fingerprint (FIG. 2, step 112). In one embodiment, control circuit 60, on a bit by bit basis, calculates the most likely value for each bit based on the iterative reads described above. In one embodiment, control circuit 60 also calculates a stability value (i.e., the probability that a particular bit may flip) for at least one bit in the digital fingerprint (FIG. 2, step 114) and stores it in memory 62. In one embodiment, control circuit 60 calculates a stability value for each bit in the digital fingerprint. However, to reduce the amount of stored data, In one embodiment, the digital fingerprint is divided into a plurality of sections. In one form of this embodiment, the control circuit 60 stores in memory 62 the most probable fingerprint and the stability values corresponding to the least stable bit in each section of the fingerprint (FIG. 2, step 116). As discussed more fully below, embodiments of the present invention use these stability values in an optimized lookup method. According to one embodiment of the present invention, control circuit 60 calculates the most probable fingerprint and, optionally, stability values and stores such values in memory each time user device 40 is powered up.

According to the invention, the most probable fingerprint must, at some point, be stored in a database (such as fingerprint section database 24 shown in FIG. 1) in association with other data in order for the corresponding user device 40 to be subsequently identified. In one embodiment, calculation of the most probable fingerprint from user device 40 is integrated into the manufacturing process. Specifically, during the manufacturing process, fingerprint circuit 42 is polled according to the method of FIG. 2 or any other suitable method to calculate the most probable fingerprint. In one embodiment, this most probable fingerprint is stored in a database (such as fingerprint section database 24) in association with other data (e.g., an index identification). In one embodiment, the most probable fingerprint and/or index identification can later be associated with other data (e.g., user name, user account data, and the like) and used to identify an associated user or device.

In embodiments where the most probable fingerprint is stored during the manufacturing process, user device 40 can be configured to transmit only the most stable sections of the fingerprint and corresponding section identifications. These sections and section identifications can be used to identify user device 40 according to an optimized lookup methodology, discussed below. In another embodiment, the most probable fingerprint from fingerprint circuit 42 is performed post-manufacturing and transmitted from a remote location and stored in a database, such as fingerprint section database 24. For example and in one embodiment, the fingerprint corresponding to user device 40 may be stored in fingerprint section database 24 during a registration of such device by a user. In one embodiment, a user powers up user device 40, causing it to calculate and store the most probable fingerprint, and transmits the most probable fingerprint via computer network 30 to application server 23 (see FIG. 1). Application server 23, in this embodiment, transmits the most probable fingerprint to identification lookup server 22, which stores the fingerprint in a database. In one embodiment, identification lookup server 22 breaks the fingerprint into sections and stores them in the appropriate tables 26 of fingerprint section database 24 in association with an index identification (e.g., an account identification, a device identification, etc.). During this registration, other data corresponding to the user can be stored in master database 28 in association with the index identification. In another embodiment, the stability values of each bit in the digital fingerprint is stored in association with the index identification. These stability values can be used in addition to or in lieu of the digital fingerprint to identify the device during a lookup.

Furthermore, in an embodiment using a static RAM to provide the digital fingerprint at power on, instead of storing a continuous set of bits, the algorithm can be adapted to using indexed entries. This allows supporting systems where the random bits are not densely packed with one another. In one embodiment, only bits that are likely to flip and their respective positions need be stored to later identify the fingerprint.

B. Fuzzy Lookup Methodology

According to one embodiment of the present invention, each fingerprint is broken or divided into sections, which are compared to corresponding sections of previously stored fingerprints in order to find a match. According to one embodiment, a digital fingerprint is identified with respect to how many matching sections are found. In one embodiment, fingerprints are divided into sections of equal length. For example and in one embodiment, a 288-bit fingerprint is divided into 12 sections each comprising 24 bits. Therefore, a particular fingerprint section has a probability of 1:16,777,216 ($1:2^{24}$) of being a match. Depending on the population size (1 million, for example) of fingerprints stored in the database, a fingerprint candidate in the database that includes two matching sections is very likely the matching fingerprint. In one embodiment, in a population of 1 million fingerprints, a fingerprint candidate that includes three matching sections is statistically sufficient for an identification. Accordingly, this embodiment of the present invention compensates for the potential that a plurality of bits in the digital fingerprint may flip since only a statistically sufficient number of matching sections need be found, rather than a matching of the entire fingerprint.

Figure 3:
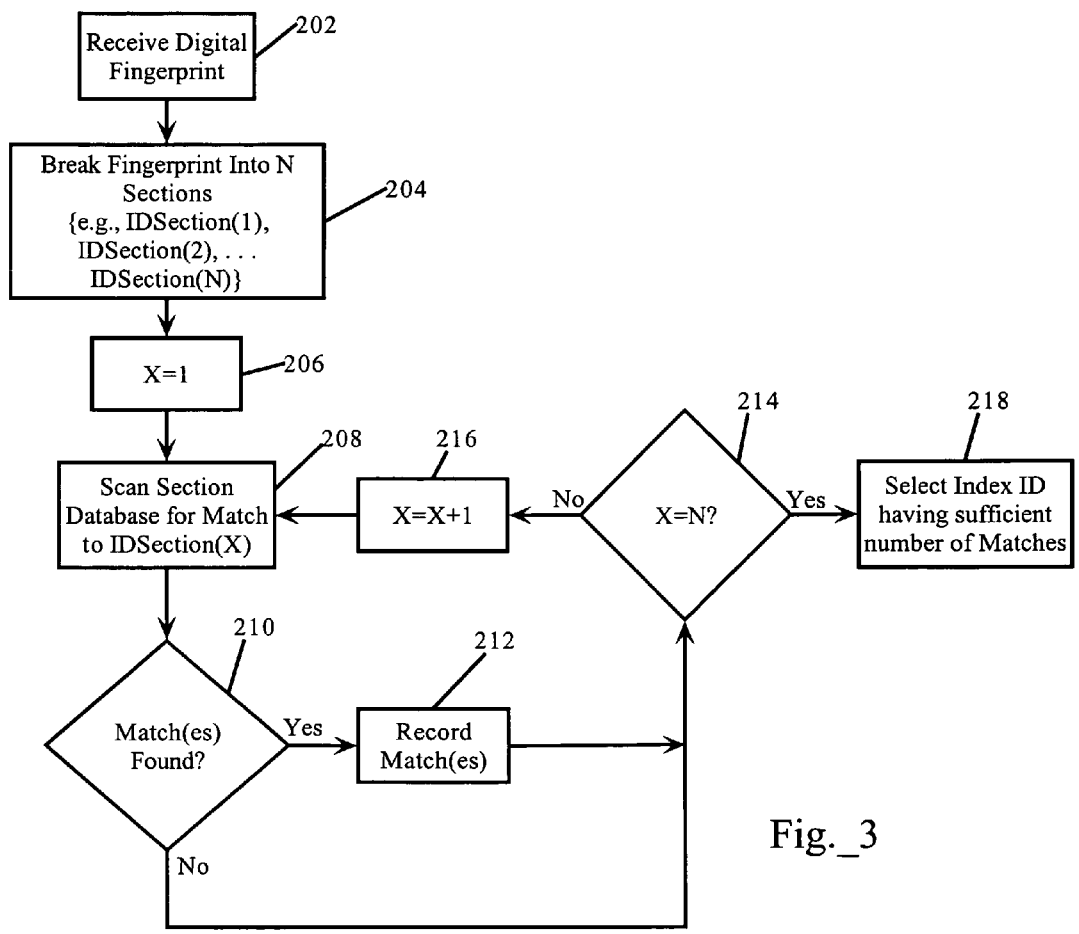
FIG. 3 is a flow chart diagram providing a method allowing for identification of a digital fingerprint.

FIG. 3 illustrates a method for identifying a device based on its digital fingerprint. In the embodiment shown, identification lookup server 22 receives a digital fingerprint (FIG. 3, step 202) and breaks the fingerprint into sections, the number and length of which are determined by the structure and arrangement of fingerprint section database 24 (step 204). In another embodiment, identification lookup server 22 receives the digital fingerprint already divided into sections. In one embodiment, starting at the first section (step 206), identification lookup seer 22 scans fingerprint section database 24 for matching sections (step 208). If a matching section is found (step 210), the index identification associated with that section is recorded (step 212). In the embodiment shown, this process is repeated for all sections of the fingerprint (steps 214, 216 and 208). In another embodiment, the process continues until a statistically sufficient number of matches corresponding to a single index identification is found. In the embodiment shown in FIG. 3, however, once all sections have been scanned, identification lookup server 22 selects the index identification with a statistically sufficient number of matching sections (step 218).

In one embodiment, identification lookup server 22 transmits each fingerprint section to fingerprint section database 24 comprising section tables 26 (see FIG. 1). In one embodiment, each section table 26 of fingerprint section database 24 is supported by a separate database server. In one form of this embodiment, identification lookup server 22 transmits each section of the received fingerprint to the appropriate section table database server to find matching sections. In this embodiment, identification server 22 keeps track of matching sections found by the database servers and selects the index identification with a statistically sufficient number of matching sections. The redundancy in the algorithm translates into redundancy at the database level. In a large scale system, where each table is stored of a separate server, a failure of a single or few tables is not catastrophic, as the algorithm can still be used even on an incomplete set of tables.

1. Optimization of Lookup Methodology

In one embodiment of the present invention, the stability values of each section of the fingerprint are used to optimize the fingerprint identification and reduce the processing requirements for identifying a match. As discussed above, as the most probable fingerprint is computed, one embodiment of the present invention creates a stability mask of sections (i.e., by using the stability value of the least stable bit in a given section, the section mask identifies which sections are most likely to be stable). When a fingerprint is uploaded to identification lookup server 22, only the most stable sections are used to compute a lookup which minimizes the amount of processing on the server. Of course, the size and number of sections, as well as the size of the fingerprint population determine the number of section matches required to adequately identify a given digital fingerprint.

FIG. 4 sets forth optimized method for identifying fingerprint. In one embodiment, identification lookup server 22 receives an entire digital fingerprint and section stability values corresponding to the sections of the fingerprint (step 202). Identification lookup server 22 then passes only the sections having the highest stability values to the appropriate section tables 26 of fingerprint section database 24 (step 204). In another embodiment, user device 40 passes to application server 23 only the sections having the highest stability values and their corresponding section identifications, which identification lookup server 22 uses to pass the sections to the appropriate section tables 26. In either form, the number of sections used for matching purposes depends on the number and size of the sections in the fingerprint and the size of the fingerprint population.

Whether identification lookup server 22 or user device 40 selects the most stable sections, identification lookup server 22 tracks the matches in fingerprint section database 24 to determine whether an index identification exists that possesses a statistically sufficient number of matches (FIG. 4, steps 306 and 308). For example and in an embodiment where the fingerprint population is one million, identification lookup server 22 can pass the five most stable sections to the appropriate section tables 26 and select the digital fingerprint candidate, if any, that includes three matching sections. If no such index identification is found, all fingerprint sections, in one embodiment, are passed to fingerprint section database 24 (step 310). Identification lookup server 22 then performs the lookup using all sections (steps 312 and 308). If no index identification is found, an error message is generated (step 314).

With respect to the above-provided description, one skilled in the art will readily recognize that the present invention has application in a variety of contexts. The foregoing description illustrates the principles of the present invention and provides examples of its implementation. For example, although an embodiment of the present invention has been described wherein user device 40 communicates with application server 22 over a computer network, user device can be directly connected to application server 22 to communicate digital fingerprint data. Accordingly, the above-provided description is not intended to limit the scope of the claims to the exact embodiments shown and described.

What is claimed is:

1. A method for resolving the most probable digital fingerprint from a circuit, the circuit outputting a digital fingerprint comprising a series of bits, the method comprising the steps of:
   (a) polling the circuit, the circuit being disposed on a silicon die and comprising two or more devices formed on the silicon die, for a digital fingerprint, the digital fingerprint being based at least in part on an electrical characteristic of the two or more devices of the circuit due to a process by which the silicon die was manufactured, wherein the digital fingerprint comprises at least two sections, each section comprising a series of bits;
   (b) recording the digital fingerprint;
   (c) repeating steps (a) and (b) a desired number of times to result in one or more fingerprinting values for a corresponding iteration of said polling and said recording;
   (d) calculating a most probable digital fingerprint from the one or more fingerprinting values yielded in steps (a)-(c);
   (e) calculating a stability value of each bit in said digital fingerprint; and
   (f) for each section, storing the stability value of the least stable bit in each section in association with a section identifier and the most probable digital fingerprint calculated in step (d).

2. The method of claim 1 further comprising the step of (e) storing the most probable digital fingerprint.

3. The method of claim 1 further comprising the step of
   (g) transmitting the most probable digital fingerprint calculated in step (d), and the section identifiers and corresponding stability values stored in step (f).

4. The method of claim 1 further comprising the step of
   (g) transmitting at least two section identifiers and corresponding sections of the most probable digital fingerprint, the sections having the highest stability values calculated in step (e).

5. The method of claim 4 wherein the number of sections transmitted in step (g) is statistically sufficient to find a matching digital fingerprint.

6. An apparatus providing a digital fingerprint comprising:
   a digital fingerprint circuit, said digital fingerprint circuit outputting a digital fingerprint comprising a plurality of bits corresponding to electrical characteristics of a plurality of devices, the digital fingerprint circuit being disposed on a silicon die and comprising the plurality of devices formed on the silicon die, the digital fingerprint being based at least in part on an electrical characteristic of the plurality of devices of the circuit due to a process by which the silicon die was manufactured; and
   a control circuit, said control circuit operably connected to the digital fingerprint circuit and programmed to iteratively read the digital fingerprint a predetermined number of times; wherein the control circuit calculates the most probable digital fingerprint based on the iterative reads of the digital fingerprint circuit, wherein the digital fingerprint comprises a plurality of sections, each of the sections comprising a plurality of bits, wherein the control circuit calculates a stability value for each bit of the digital fingerprint, and wherein, for each section of the digital fingerprint, the control circuit stores in the memory the stability value of the least stable bit.

7. The apparatus of claim 6 further comprising
   a memory operably connected to the control circuit;
   wherein the control circuit stores the most probable digital fingerprint in the memory.

8. The apparatus of claim 6 wherein the control circuit calculates a stability value for at least one bit of the digital fingerprint based on the iterative reads of the digital fingerprint circuit.

9. The apparatus of claim 6 further comprising means for transmitting the digital fingerprint and the stability values stored in the memory.

10. A method for resolving an identification, said method comprising the steps of
    (a) receiving a digital fingerprint corresponding to characteristics of a circuit, the circuit being disposed on a silicon die and comprising two or more devices formed on the silicon die, the digital fingerprint being based at least in part on an electrical characteristic of the two or more devices of the circuit due to a process by which the silicon die was manufactured;
    (b) dividing the digital fingerprint into at least two sections, the sections comprising a series of bits;
    (c) storing the sections in association with an index identification in a database;
    (d) repeating steps (a)-(c) a desired number of times;
    (e) calculating a stability value of each bit in said digital fingerprint;

(f) for each section, storing the stability value of the least stable bit in each section in association with a section identifier;

(g) scanning the database for sections stored in step (c) that match the sections of step (b); and (h) selecting the index identification associated with a statistically sufficient number of matching sections.

11. The method of claim 10 wherein said storing step (c) comprises the steps of (c1) storing each section in a separate table in association with the index identification.

12. The method of claim 11 wherein separate database servers support each table.

13. A method for identifying a digital fingerprint corresponding to an integrated circuit from a database including a population of fingerprints, the method comprising the steps of:

(a) receiving a digital fingerprint of the integrated circuit, the integrated circuit comprising two or more devices formed on the integrated circuit, the digital fingerprint being based at least in part on an electrical characteristic of the two or more devices of the integrated circuit due to a process by which the integrated circuit was manufactured, wherein the digital fingerprint comprises at least two sections, wherein the sections comprise a series of bits;

(b) receiving section identifiers and corresponding stability values for each section of the digital fingerprint;

(c) for each section, storing the stability value of the least stable bit in association with the section identifier;

(d) using sections having the highest stability values, scanning for sections of the fingerprints stored in the database that match corresponding sections of the digital fingerprint received in step (a);

(e) selecting the digital fingerprint stored in the database associated with a statistically sufficient number of matching sections.

14. The method of claim 13 wherein the database comprises at least two section tables each of which stores a separate section of the fingerprints in association with a corresponding index identification; and wherein the scanning step (d) comprises scanning the section tables with corresponding sections of the digital fingerprint received in step (a).

15. The method of claim 14 wherein a separate database server supports each section table.

16. The method of claim 14 further comprising the steps of (f) if no digital fingerprint corresponds to a statistically sufficient number of matching sections, scanning the database for all sections stored in the section tables that match the sections received in step (a); and, (g) selecting the digital fingerprint associated with a statistically sufficient number of matching sections.

\* \* \* \* \*